United States Patent
He et al.

(10) Patent No.: US 6,992,828 B2
(45) Date of Patent: Jan. 31, 2006

(54) OPTICAL ATTENUATOR SYSTEM

(75) Inventors: Gang He, Quebec (CA); Martin Lamonde, Quebec (CA)

(73) Assignee: EXFO Electro-Optical Engineering Inc., Quebec (CA)

( * ) Notice: Subject to any disclaimer, the term of this patent is extended or adjusted under 35 U.S.C. 154(b) by 0 days.

(21) Appl. No.: 10/482,844

(22) PCT Filed: Jul. 5, 2002

(86) PCT No.: PCT/CA02/01237

§ 371 (c)(1),
(2), (4) Date: Jan. 6, 2004

(87) PCT Pub. No.: WO03/005064

PCT Pub. Date: Jan. 16, 2003

(65) Prior Publication Data

US 2004/0165274 A1    Aug. 26, 2004

Related U.S. Application Data

(60) Provisional application No. 60/303,090, filed on Jul. 6, 2001.

(51) Int. Cl.
G02B 13/20    (2006.01)
G02B 5/02    (2006.01)
(52) U.S. Cl. ...................................... 359/599; 359/613
(58) Field of Classification Search ................ 359/599, 359/601–614, 707, 738–740; 356/225, 432; 385/33
See application file for complete search history.

(56) References Cited

U.S. PATENT DOCUMENTS

| | | | | |
|---|---|---|---|---|
| 3,887,262 A | * | 6/1975 | Blau et al. | 359/350 |
| 4,411,521 A | * | 10/1983 | Jourdan et al. | 356/225 |
| 4,946,282 A | * | 8/1990 | Task | 356/432 |
| 5,751,869 A | * | 5/1998 | Li et al. | 385/33 |
| 6,097,034 A | * | 8/2000 | Weckstrom et al. | 250/495.1 |

* cited by examiner

Primary Examiner—Thong Q. Nguyen
(74) Attorney, Agent, or Firm—Thomas Adams

(57) ABSTRACT

A uniform optical attenuation system for high power detection comprises a detector unit (11), a plurality of diffusing elements (14, 15, 16, 17) for receiving and diffusing input light and an apertured plate (18, 19) for limiting light received by the detection unit to a portion only of the light diffused by the diffusing arrangement. The plurality of diffusing elements comprise a first diffusing element (12) for receiving and diffusing an input light beam to provide a distributed light source for a subsequent one of the diffusing elements, and final one of the diffusing elements which directs diffused light towards the detection unit. The light detected by the detection unit (11, 18, 19) is substantially independent of variations in numerical aperture of the input light. Each diffusing element may be a diffusing surface, such as a ground glass or opal diffuser, which renders the system substantially independent of variations in optical properties due to heating effects caused by the high energy light.

15 Claims, 2 Drawing Sheets

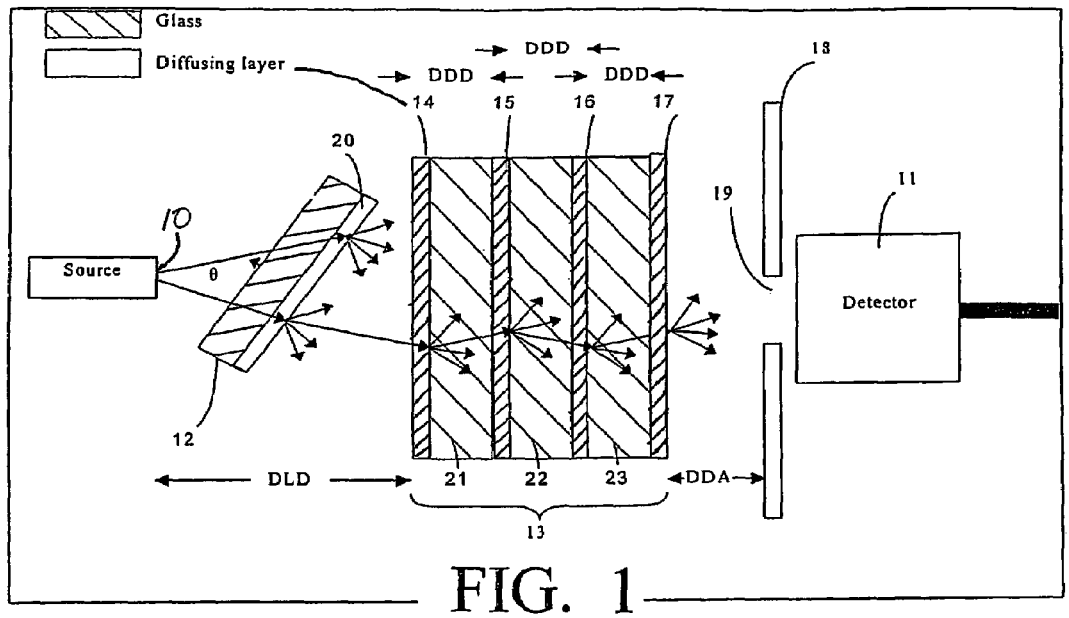
FIG. 1
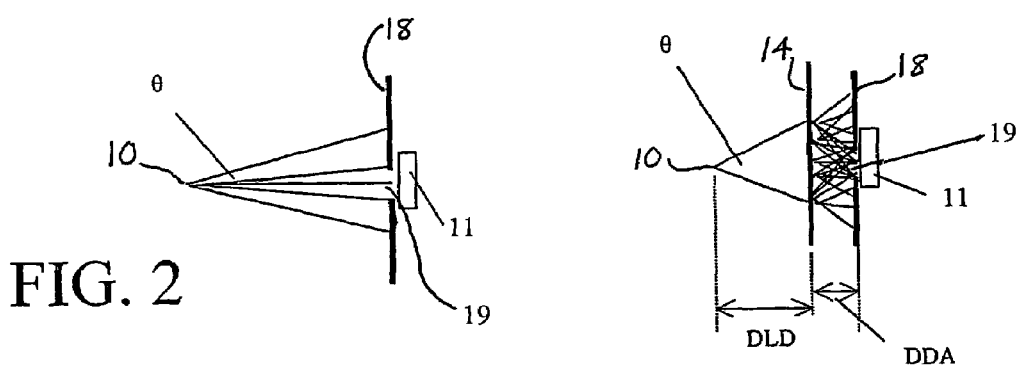
FIG. 2
FIG. 3
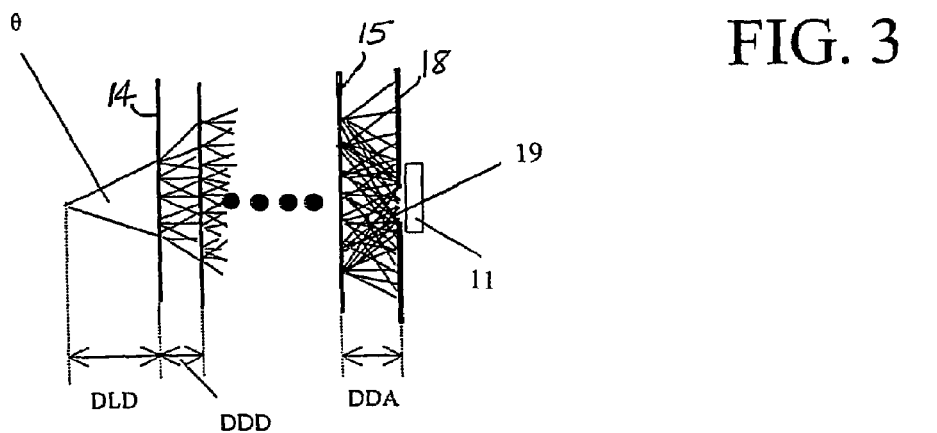
FIG. 4

OPTICAL ATTENUATOR SYSTEM

This application claims priority from U.S. Provisional patent application No. 60/303,090 filed Jul. 6, 2001, the contents of which are incorporated herein by reference.

TECHNICAL FIELD

This invention relates to optical attenuation systems, especially, but not exclusively, for attenuating light from high energy light sources prior to detection.

BACKGROUND ART

Known optical attenuation systems used, for example, to adjust light levels in optical communications systems, comprise absorption filters, metallic masks, integrating spheres, partially-reflective (or transmissive) windows or surfaces, diffraction elements or crossed polarizers. Unfortunately, such attenuation systems do not provide a stable output when used with light sources having high power levels.

Although they offer a high level of attenuation, mostly insensitive to input source beam shape, a disadvantage of the above-mentioned attenuation systems is that the degree of attenuation is not stable due to temperature effects resulting from heat generated in the body of the attenuation elements by the high energy light being received. For even higher energy levels, the heat may be sufficient to cause permanent damage to the attenuation elements.

To overcome, or at least mitigate, the heating effects, complex cooling mechanisms or systems may be devised at the expense of cost, size and reliability. For example, the problem of variations due to heating in attenuation systems which use adjustable diffraction elements, of the kind disclosed in U.S. Pat. No. 4,561,721 (Keilmann et al.), were addressed in U.S. Pat. No. 5,202,794 (Schnee et al.) by moving the diffraction element continuously so as to allow for cooling of a part that had just been irradiated. This arrangement is not entirely satisfactory, however, because the adjustment mechanism increases expense and reduces reliability.

Another approach that someone skilled in the art may readily use to obtain very high power detection is to limit the aperture size at the detector, for example by using an aperture in a screen in front of the detector, thus capturing only part of the light. Unfortunately, however, this technique is very sensitive to the input source numerical aperture and its position in relation to the aperture-detector combination.

An object of the present invention is to mitigate these disadvantages of known attenuation systems and to provide an optical attenuation system better suited to the detection of high energy light beams.

DISCLOSURE OF INVENTION

According to the present invention, an optical attenuation system comprises a diffusing unit for receiving and diffusing input light and a detection unit adapted to receive a portion only of the light diffused by said diffusing unit, said diffusing unit comprising a plurality of diffusing elements including a first diffusing element for receiving and diffusing said input light to provide a distributed light source for a subsequent one of said diffusing elements, and a final one of said diffusing elements for supplying diffused light to said detection unit, the arrangement being such that the light detected by said detection unit is substantially independent of variations in numerical aperture of the input light.

Such an optical attenuation system advantageously exhibits relatively low sensitivity to input light source numerical aperture within a predetermined range while maintaining stable attenuation, even with very high power levels. This reduced sensitivity to input source numerical aperture can be achieved by using a transmissive diffusing unit with sufficient diffusion to render the energy distribution of said light detected by said detection unit substantially independent of input source numerical aperture within a predetermined range. Preferably, the range is from 0.1 to 0.3, i.e. encompassing common telecommunication fibers.

The high power, stable attenuation can be obtained using plural diffusing elements substantially insensitive to temperature effects (such as surface diffusers like ground glass surfaces, opal diffusing surfaces, or a combination thereof, which would be equivalent to a near-ideal volume diffuser that would not be susceptible to optical property variations due to heating effects caused by the high power levels.

The detection unit may comprise a detector with a separate apertured plate to limit light received thereby, or a detector sized to receive only said portion.

Various features, objects and advantages of the invention will become apparent from the following description of an embodiment of the invention which now will be described by way of example only.

BRIEF DESCRIPTION OF THE DRAWINGS

FIG. 1 is a schematic view of an optical attenuation system for high power detection embodying the invention;

FIG. 2 illustrates attenuation by an aperture limiting the light reaching a detector;

FIG. 3 illustrates the effect of inserting a diffusing element in front of the aperture of FIG. 2;

FIG. 4 illustrates an optical attenuation system having multiple diffusing elements of the surface diffuser type;

DETAILED DESCRIPTION OF PREFERRED EMBODIMENTS

Figure 5:
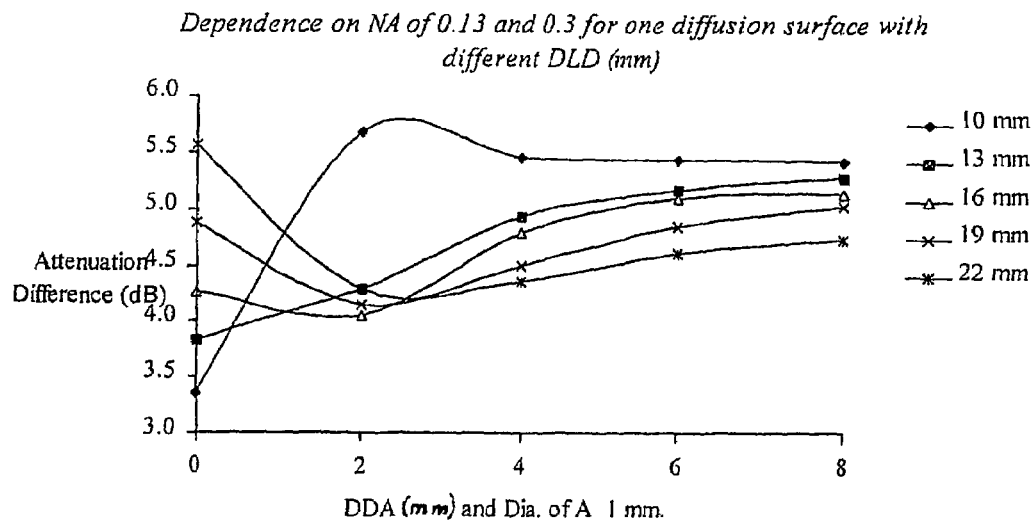
FIG. 5 depicts attenuation difference vs. spacing from final diffusing surface to aperture for different numerical apertures and for different distances between the input source and a first diffusing element comprising a simple diffusing surface.

FIG. 1 illustrates an optical attenuation system suitable for use in attenuating high energy light, such as the light from a high power laser or other source which diverges from an optical fiber 10, whose end face effectively constitutes a point source, and is attenuated before being detected by a detector 11, for example an InGaAs detector. The attenuation system has an optional protective window 12, a bank 13 of four diffusing elements 14, 15, 16 and 17, and a screen plate 18 with a central aperture 19, all disposed in series in an optical path between the source 10 and detector 11. Only a portion of the light leaving the source 10 will pass through the aperture 19. The detector 11 will be dimensioned and positioned so as to receive substantially all of the light passing through the aperture 19. The optional window 12 is inclined so as to reduce back-reflections and its surface 20 furthest from the source 10 is ground to substantially avoid interference effects. While the ground surface 20 provides some diffusion, it is not essential since the diffusing elements 14, 15, 16 and 17 can provide sufficient diffusion, as can be seen from FIG. 6. Moreover, interference effects can be substantially eliminated if each diffusion element has at least one diffusion surface.

In this specific embodiment, each of the diffusing elements 14, 15, 16 and 17 is a surface diffuser provided at the surface of a glass block, either as a ground glass surface or as an opal diffuser; or a combination of the two. Thus, the first and second diffusing surfaces 14 and 15 are provided on opposite surfaces, respectively, of a glass block 21, and the third and fourth diffusing surfaces 16 and 17 are provided on trailing surfaces of two glass blocks 22 and 23, respectively. The glass blocks 21, 22 and 23 with diffusing surfaces 14, 15, 16 and 17 are clamped together to form a sandwich.

Alternatively, each of the glass blocks 21, 22 and 23 could be ground, or opal, on both opposite surfaces. The intermediate-diffusing surfaces 15 and 16 then would be formed each by the juxtaposed surfaces of the pairs of adjacent blocks, i.e. 21, 22 and 22, 23, respectively.

In use, each of the diffusing surfaces 14–17 will be positioned and sized so that all of the light from source 10 will impinge upon it, regardless of the numerical aperture which, for a monomode fiber input source 10, will correspond to a divergence angle θ of about 14 degrees and, for a multimode fiber input source 10, will correspond to a divergence angle θ of about 28–30 degrees.

In operation, light from the light source 10 will be diffused by diffusing surface 20, which then will present a distributed light source to the diffusing surface 14. Likewise, diffusing surface 14 and each of the succeeding diffusing surface 15 and 16 will present a distributed light source to the following diffusing surface. Finally, a portion of the diffused light leaving final diffusing surface 17 will pass through the aperture 19 and be received/detected by the detector 11.

The degree of attenuation may be controlled by controlling the distance DLD between the light source 10 and the first diffusing surface 14, the distance DDA between the final diffusing surface 17 and the aperture 19 (or the detector 11 if no aperture 19 is provided), and the distances DDD between the diffusing surfaces 14, 15, 16 and 17. In addition, attenuation may be adjusted by adjusting the size of the aperture 19 or the size of the detection surface of the detector 11, if no aperture 19 is provided.

It should be noted, therefore, that the screen plate 18, with its aperture 19, could be omitted and the size of the detector 19 and its spacing from diffusing surface 17 adjusted to obtain the required degree of attenuation. The size of the detector 11 itself, therefore, could be a determining factor in selecting the amount of light received and hence the degree of attenuation. In this case, the detector 11 would act as the aperture and the distance DDA would be measured from the final diffusing surface 17 to the detector 11.

In a practical attenuator, the above-specified sizes, spacings and number of diffusing surfaces will be selected so, as to ensure that the output of the optical attenuation system is uniform, regardless of the numerical aperture of the input light beam, and stable over a wide range of energy levels of the light beam. Testing of practical optical attenuation systems constructed in the above-described manner revealed that, with suitable control of such dimensions, a remarkable lack of sensitivity to energy levels and numerical aperture could be obtained.

As illustrated in FIG. 2, when the screen/plate 18 is disposed between the source 10 and detector 11, only a portion of the light from the source 10 passes through the aperture 19 and reaches the detector 11. The size of such portion in relation to the input light dominates in determining the amount of attenuation. FIG. 3 illustrates a similar arrangement but wit a single diffusing surface interposed between the source 10 and the aperture 19. FIG. 4 illustrates an embodiment of the present invention comprising a plurality of diffusing surfaces in cascade between the light source 10 and the detector 11. In this arrangement, each diffusing surface acts as a distributed light source, with the result that the intensity of the light leaving the final diffusing surface 17 has a more uniform spatial energy distribution across its surface. Experiments with such an arrangement have demonstrated that the intensity of the light reaching the detector 11 via the aperture 19 is substantially independent of variations in the numerical aperture of the input light source.

Tests were conducted using a pigtailed laser light source 10 and the attenuation system shown in FIG. 1, but without protection window 12; first with only one diffusing surface 17, and then with all four diffusing surfaces 14–17.

FIG. 5 is a set of curves for different spacings (DLD and DDA) of a single diffusing surface from the light source and aperture, respectively, and shows, for each spacing, the difference between the attenuation for a N.A. of 0.13 and the attenuation for a N.A. of 0.3, in each case as a function of spacing DDA between the single diffusing surface and the aperture-detector arrangement. The diameter of the aperture 19 was 1 mm. FIG. 5 shows a significant difference, as much as 5.5 dB, when the numerical aperture changes. It will be seen from FIG. 5 that the attenuation variation with input source (0.13 to 0.3), with the addition of a single diffusing surface, is comparable to that of the aperture-detector alone, i.e. adding a single diffusing surface did not improve the sensitivity to numerical aperture provided by the aperture-detector arrangement alone.

Figure 6:
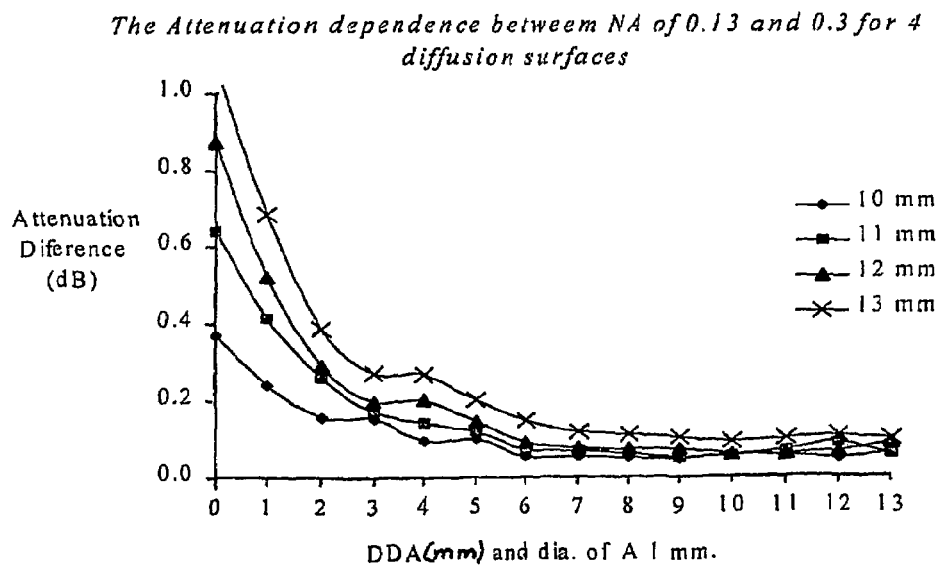
FIG. 6 depicts attenuation difference vs. spacing from the final diffusing surface to the aperture for different distances between the source and the first of four diffusing surfaces.

FIG. 6 is a corresponding set of curves for different spacings (DLD) and DDA) of an optical attenuator embodying the present invention and having four diffusing surfaces in cascade. As in the case of FIG. 5, the diameter of the aperture 19 was 1 mm. FIG. 6 demonstrates that, by appropriate selection of distance DDA, the difference between the attenuation for a N.A. of 0.13 and the attenuation for a N.A. of 0.3 can he substantially reduced, to about 0.1 dB or less.

As can be seen from FIG. 6, when the dimension DDA is greater than about 7 mm, and the dimension DLD is 12 mm or less, the attenuation difference is less than 0.1 dB. For example, attenuation in the range from 30–35 dB with less than 0.1 dB sensitivity to numerical aperture can be obtained wit four diffusion surfaces with a spacing (DDD) between adjacent said diffusion surfaces of about 1 mm, the spacing (DLD) between the light source (10) and the first diffusion surface (14) being about 3 mm, and the spacing (DDA) between the aperture (19) and the final diffusion surface being about 7 mm.

Embodiments of the invention using surface diffusers provide input source NA independent attenuation which should be similar to that of a near-ideal volume diffuser. One would expect, however, that a practical volume diffuser would be subject to variation of optical properties due to heating effects that are substantially negligible when a plurality of surface diffusers are used in combination.

Thermally, the advantages of using surface diffusers are twofold in that: (i) the heat is broadly distributed, thus having smaller local heating effect; and (ii) the properties of the surface diffusers are substantially insensitive to heating in themselves.

It will be appreciated that these experimental results show that embodiments of the present invention using a plurality of diffusers are relatively insensitive to numerical aperture variation.

Further tests have shown that optical attenuation systems for high power detection fabricated in accordance with the present invention, though very inexpensive, perform better than commercially-available high power attenuation systems, which are considerably more expensive. In fact, during tests, embodiments of the invention performed satisfactorily with power levels so high (above 38 dBm) that one of the commercially-available optical attenuators was damaged.

It should be appreciated that, although ground glass or opal diffusers are preferred because they are readily available commercially, other more exotic surface diffusers could be used. For example, suitable surface diffusers might be made by etching the glass block surface or forming diffraction gratings in it, or by forming surface holograms directly upon the glass. It should also be appreciated that, instead of glass, other materials could be used, providing their optical properties would not be significantly affected by the high power levels.

INDUSTRIAL APPLICABILITY

An advantage of embodiments of the invention, which use surface diffusers in tandem, is that they are less susceptible to variations caused by heating effects, generally insensitive to changes in the numerical aperture of the input light to be attenuated, relatively inexpensive to make, and very compact.

Embodiments of the invention advantageously are substantially insensitive to input source numerical aperture within the optical fiber NA ranges of 0.1 to 0.3, yet are capable of handling very high powers while avoiding changes in attenuation properties due to heating effects.

What is claimed is:

1. An optical attenuation system comprising a diffusing unit (14,15,16,17) for receiving and diffusing an input light beam diverging at a divergence angle (θ) from a source (10) and a detection unit (11,18,19) adapted to receive a desired portion only of the light diffused by said diffusing unit (14,15,16,17), said diffusing unit (14,15,16,17) comprising a plurality of diffusing elements including a first diffusing element (14) for receiving and diffusing said input light to provide a distributed light source for a subsequent one (15) of said diffusing elements, and a final one (17) of said diffusing elements for supplying diffused light to said detection unit (11,18,19), the arrangement being such that the light detected by said detection unit (11,18,19) is substantially independent of variations in said divergence angle (θ) of the input light beam.

2. An optical attenuation system according to claim 1, wherein each of said diffusing elements (14,15,16,17) comprises at least one diffusing surface.

3. An optical attenuation system according to claim 2, wherein the diffusing surface (14,15,16,17) comprises a ground surface on a transparent substrate (21,22,23).

4. An optical attenuation system according to claim 3, wherein said substrate (21,22,23) comprises glass.

5. An optical attenuation system according to claim 2, wherein the diffusing surface is an opal diffuser element (14,15,16,17) on a transparent substrate (21,22,23).

6. An optical attenuation system according to claim 5, wherein said substrate (21,22,23) comprises glass.

7. An optical attenuation system according to claim 1, wherein spacings (DLD, DDA) between an input source (10) and the first diffusing element (14), between the detection unit (11,18,19) and the final diffusing element (17), and (DDD) between adjacent pairs of the diffusing elements, and the number of diffusing elements, are selected so as to provide a desired level of attenuation and desired level of insensitivity to changes in said divergence angle of said input light beam.

8. An optical attenuation system according to claim 1, wherein said detection unit (11,18,19) comprises a detector (11) and an aperture (19) disposed between said detector (11) and said final diffusing element (17), the aperture (19) being sized and positioned so as to pass only said portion of the diffused light.

9. An optical attenuator system according to claim 8, wherein detector (11) is sized and positioned so as to receive substantially all of the light which has passed through said aperture (19).

10. An optical attenuation system according to claim 9, wherein, for attenuation in the range from 30–35 dB wit less than 0.1 dB sensitivity to said divergence angle (θ), the system comprises four diffusion elements each having a diffusion surface, the spacing (DDD) between adjacent said diffusion surfaces being about 1 mm, the spacing (DLD) between the light source (10) and the first diffusion surface (14) being about 3 mm, and the spacing (DDA) between the aperture (19) and the final diffusion surface being about 7 mm.

11. An optical attenuation system according to claim 8, wherein, for attenuation in the range from 30–35 dB with less than 0.1 dB sensitivity to said divergence angle (θ), the system comprises four diffusion surfaces, the spacing therebetween (DDD) being 1 mm, the spacing (DLD) between the light source (10) and the first diffusion element (14) being 3 mm, and the spacing (DDA) between the aperture (19) and the final diffusion element being 7 mm.

12. An optical attenuation system according to claim 1, wherein the detection unit comprises a detector (11) that is sized and positioned so as to receive only said portion of the diffused light from the final diffusing element (17).

13. An optical attenuation system according to claim 12, wherein, for attenuation in the range from 30–35 dB with less than 0.1 dB sensitivity to said divergence angle (θ), the system comprises four diffusion surfaces, the spacing therebetween (DDD) being 1 mm, the spacing (DLD) between the light source (10) and the first diffusion element (14) being 3 mm, and the spacing (DDA) between the detector (11) and the final diffusion element being 7 mm.

14. An optical attenuation system according to claim 1, further comprising a window (12) positioned upstream of the first diffusion element (14) and configured to reduce back-reflection of the input light.

15. An optical attenuation system according to claim 14, wherein a surface (20) of said window (12) closest said first diffusion element (14) is ground to at least reduce interference effects.

* * * * *